(12) United States Patent
Hirao

(10) Patent No.: US 11,070,827 B2
(45) Date of Patent: Jul. 20, 2021

(54) TRANSMISSION APPARATUS, TRANSMISSION METHOD, AND PROGRAM

(71) Applicant: SONY CORPORATION, Tokyo (JP)

(72) Inventor: Hidetomo Hirao, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/753,409

(22) PCT Filed: Sep. 27, 2018

(86) PCT No.: PCT/JP2018/035841
§ 371 (c)(1),
(2) Date: Apr. 3, 2020

(87) PCT Pub. No.: WO2019/073802
PCT Pub. Date: Apr. 18, 2019

(65) Prior Publication Data
US 2020/0314439 A1 Oct. 1, 2020

(30) Foreign Application Priority Data
Oct. 11, 2017 (JP) .............................. JP2017-197723

(51) Int. Cl.
*H04N 19/30* (2014.01)
*H04N 19/50* (2014.01)

(52) U.S. Cl.
CPC ............ *H04N 19/30* (2014.11); *H04N 19/50* (2014.11)

(58) Field of Classification Search
None
See application file for complete search history.

(56) References Cited

FOREIGN PATENT DOCUMENTS

WO   WO 2017/100769 A1   6/2017

OTHER PUBLICATIONS

Hsiao-Chiang Chuang et al: "On the buffer dynamics of scalable video streaming over wireless network", 2004 IEEE 60th Vehicular Technology Conference. VTC2004—FALL (IEEE CAT. No. 04CH37575) IEEE Piscataway, NJ, USA, IEEE, Piscataway, NJ, USA, IEEE,vol. 4, Sep. 26, 2004 (Sep. 26, 2004), pp. 2582-2586 (Year: 2004).*

Schwarz H et al: "Overview of the Scalable Extension of the H.264/MPEG-4AVC Video Coding Standard", 21. JVT Meeting; 78. MPEG Meeting; Oct. 20, 2006-Oct. 27, 2006; Hangzhou,CN; (Joint Video Team of ISO/IEC JTC1/SC29/WG11 and ITU-T SG.16 ), No. JVT-U 145, Oct. 20, 2006 (Oct. 20, 2006) (Year: 2006).*

* cited by examiner

*Primary Examiner* — James M Anderson, II
(74) *Attorney, Agent, or Firm* — Paratus Law Group, PLLC

(57) ABSTRACT

There is provided a transmission apparatus, a transmission method, and a program that can transmit a moving image so as to be reproduced with lower latency. An encoding unit performs spatially scalable encoding on a moving image, and a transmission processing unit transmits a picture for each layer encoded by the encoding unit via a network. Then, in a case where a high possibility that underflow occurs in the reception buffer is predicted, or feedback indicating that underflow has occurred in the reception buffer is received, a reference layer control processing unit causes the encoding unit to limit a reference layer to an interlayer. The present technology can be applied to, for example, a transmission apparatus that codes and transmits a moving image.

6 Claims, 9 Drawing Sheets

TRANSMISSION APPARATUS, TRANSMISSION METHOD, AND PROGRAM

CROSS REFERENCE TO PRIOR APPLICATION

This application is a National Stage Patent Application of PCT International Patent Application No. PCT/JP2018/035841 (filed on Sep. 27, 2018) under 35 U.S.C. § 371, which claims priority to Japanese Patent Application No. 2017-197723 (filed on Oct. 11, 2017), which are all hereby incorporated by reference in their entirety.

TECHNICAL FIELD

The present disclosure relates to a transmission apparatus, a transmission method, and a program, and more particularly, relates to a transmission apparatus, a transmission method, and a program that can transmit a moving image so as to be reproduced with lower latency.

BACKGROUND ART

Conventionally, in a network camera system in which a moving image is coded and transmitted via a network and is reproduced and displayed at a remote location, for example, in order to reproduce the moving image without interruption, a certain degree of latency is necessary. However, in a case where this latency is increased, the function provided by the network camera system is adversely affected in some cases.

For example, in a case of using the network camera system in a communication system that allows two-way conversation between remote locations, it is assumed that time from utterance to a response of the other party increases due to latency, which makes smooth conversation difficult. Furthermore, in a case where the network camera system is used, for example, in a surveillance camera system that monitors a moving image of a remote location and requires a countermeasure according to the situation in the remote location, it is assumed that there will be a delay in the countermeasure according to the situation in the remote location due to latency.

Here, Patent Document 1 discloses a technique capable of improving, for example, error tolerance, in a video communication system using scalable video coding.

CITATION LIST

Patent Document

Patent Document 1: JP 5753341 B1

SUMMARY OF THE INVENTION

Problems to be Solved by the Invention

As described above, in a case where a moving image is transmitted in the network camera system and latency until the moving image is reproduced is increased, there are various adverse effects. Therefore, it is required to reproduce the moving image without interruption while suppressing latency as much as possible.

The present disclosure has been made in view of such a situation, and enables a moving image to be transmitted so as to be reproduced with lower latency.

Solutions to Problems

A transmission apparatus according to an aspect of the present disclosure includes an encoding unit that performs spatially scalable encoding on a moving image, a transmission processing unit that performs a process of transmitting a picture for each layer encoded by the encoding unit, via a network, and a reference layer control processing unit that causes the encoding unit to limit a reference layer to be referred to upon encoding of an upper layer to an intermediate layer generated from a lower layer, in a case where a high possibility that underflow occurs in a reception buffer is predicted, or feedback indicating that underflow has occurred in the reception buffer is received.

A transmission method according to an aspect of the present disclosure includes performing, a transmission apparatus that transmits a moving image, spatially scalable encoding on the moving image, performing, by the transmission apparatus, a process of transmitting a picture for each layer encoded, via a network, and performing, by the transmission apparatus, control to limit a reference layer to be referred to upon encoding of an upper layer to an intermediate layer generated from a lower layer in a case where a high possibility that underflow occurs in a reception buffer is predicted, or feedback indicating that underflow has occurred in the reception buffer is received.

An aspect or a program of the present disclosure includes causing a computer of a transmission apparatus that transmits a moving image to perform spatially scalable encoding on the moving image, to perform a process of transmitting a picture for each layer encoded, via a network, and to perform control to limit a reference layer to be referred to upon encoding of an upper layer to an intermediate layer generated from a lower layer in a case where a high possibility that underflow occurs in a reception buffer is predicted, or feedback indicating that underflow has occurred in the reception buffer is received.

In an aspect of the present disclosure, spatially scalable encoding is performed on a moving image, and a process of transmitting a picture for each layer encoded, via a network, is performed. Then, in a case where a high possibility that underflow occurs in the reception buffer is predicted, or feedback indicating that underflow has occurred in the reception buffer is received, control is performed to limit a reference layer to be referred to upon encoding of an upper layer to an intermediate layer generated from a lower layer.

Effects of the Invention

According to an aspect of the present disclosure, a moving image can be transmitted so as to be reproduced with lower latency.

Note that the effects described here is not necessarily limited, and may be any effect described in the present disclosure.

MODE FOR CARRYING OUT THE INVENTION

Hereinafter, specific embodiments to which the present technology is applied will be described in detail with reference to the drawings.

Configuration Example of Network Camera System

Figure 1:
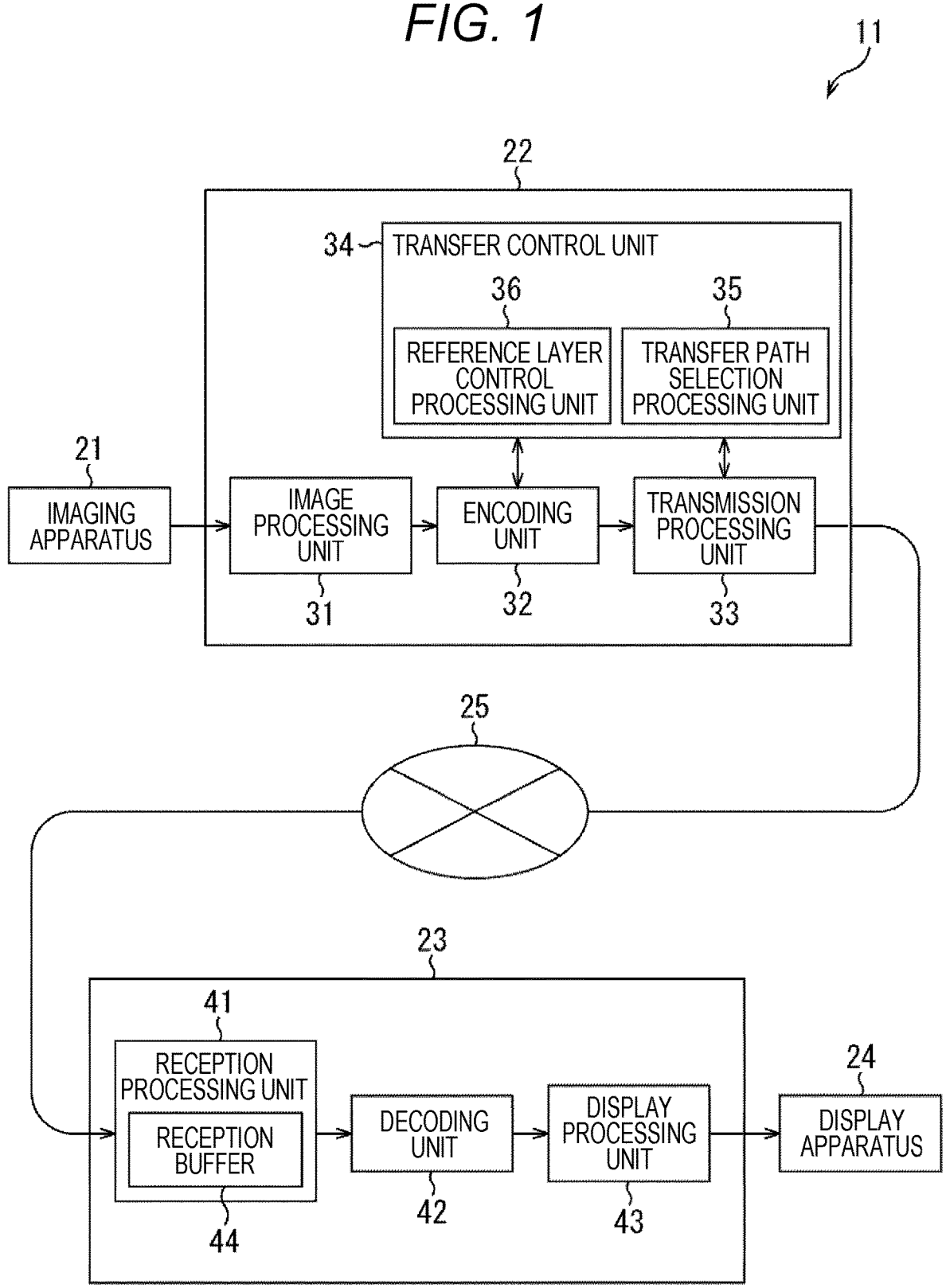
FIG. 1 is a block diagram illustrating a configuration example of an embodiment of a network camera system to which the present technology is applied.

FIG. 1 is a block diagram illustrating a configuration example of an embodiment of a network camera system to which the present technology is applied.

As illustrated in FIG. 1, a network camera system 11 is configured by connecting an imaging apparatus 21, a transmission apparatus 22, a reception apparatus 23, and a display apparatus 24 through a network 25. In addition, the transmission apparatus 22 includes an image processing unit 31, an encoding unit 32, a transmission processing unit 33, and a transfer control unit 34. The transfer control unit 34 includes a transfer path selection processing unit 35 and a reference layer control processing unit 36. Furthermore, the reception apparatus 23 includes a reception processing unit 41, a decoding unit 42, and a display processing unit 43. The reception processing unit 41 includes a reception buffer 44.

The imaging apparatus 21 includes, for example, an imaging element such as a complementary metal oxide semiconductor (CMOS) image sensor, and supplies a moving image captured by the imaging element to the image processing unit 31 of the transmission apparatus 22.

The image processing unit 31 performs various types of image processes on the moving image captured by the imaging apparatus 21, performs an image processing for adjusting, for example, the bit rate, resolution, frame rate, or the like of the moving image, and supplies the obtained moving image to the encoding unit 32.

The encoding unit 32 can perform spatially scalable encoding on the moving image supplied from the image processing unit 31, and supplies a stream of pictures (I picture, P picture, or the like) obtained by encoding the moving image to the transmission processing unit 33. Furthermore, upon encoding of the moving image, the encoding unit 32 can limit a reference layer to an interlayer IL (see FIG. 7) according to transfer control performed by the transfer control unit 34.

The transmission processing unit 33 performs a transmission process of transmitting a picture stream supplied from the encoding unit 32 to the reception apparatus 23 via the network 25. At this time, the transmission processing unit 33 can transmit a picture through the transfer path according to transfer control performed by the transfer control unit 34.

The transfer control unit 34 causes the transfer path selection processing unit 35 and the reference layer control processing unit 36 to perform transfer control so that a moving image is transferred with low latency in the network camera system 11.

The transfer path selection processing unit 35 constantly monitors sending out for each picture performed by the transmission processing unit 33, obtains the latency amount until transfer start and the rate after the transfer start, and calculates statistical values thereof. Then, as will be described with reference to FIG. 6 to be described later, the transfer path selection processing unit 35 selects the transfer path transfer through which is predicted to be completed earlier, on the basis of the calculated statistical amounts and the code amount of the picture, and causes the transmission processing unit 33 to transmit the picture through the selected transfer path.

Figure 7:
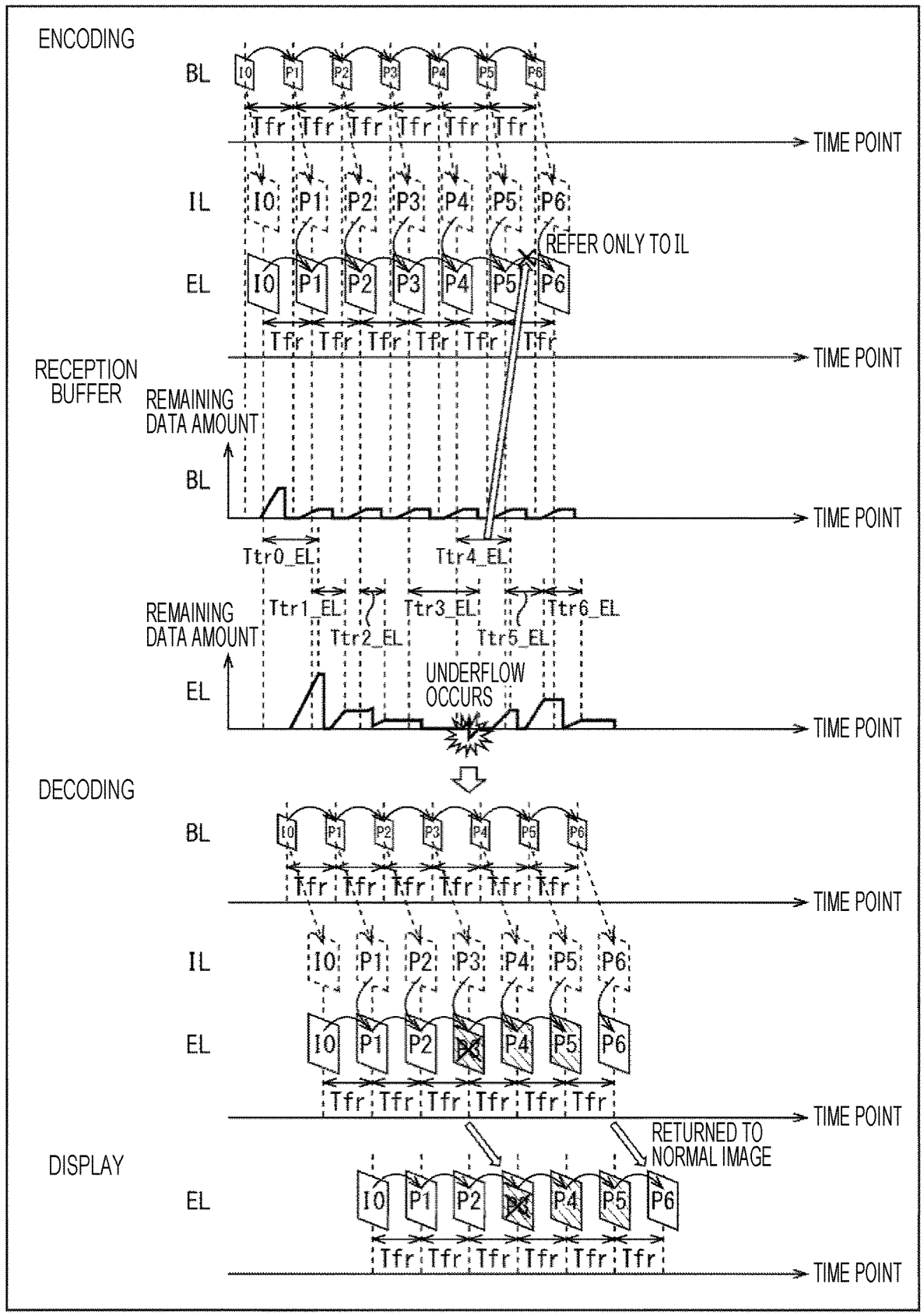
FIG. 7 is a diagram explaining a process of controlling a reference layer.
Figure 8:
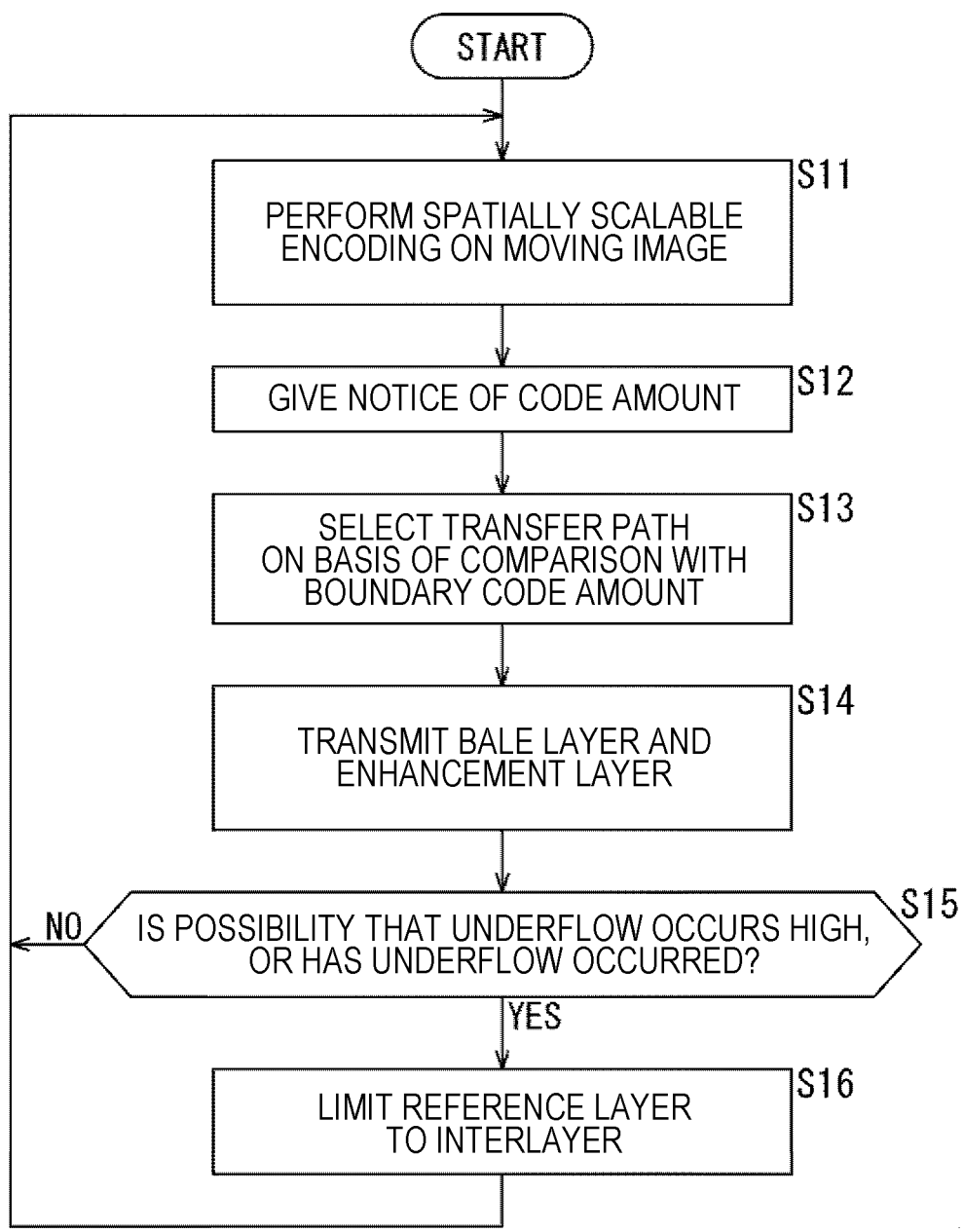
FIG. 8 is a flowchart illustrating a transmission process of transmitting a moving image.

For example, in a case where the reference layer control processing unit 36 predicts that underflow is highly likely to occur in the reception buffer 44 on the basis of the statistical values calculated by the transfer path selection processing unit 35, as will be described with reference to FIG. 7 to be described later, the reference layer control processing unit 36 causes the encoding unit 32 to limit the reference layer to the interlayer it. Furthermore, the reference layer control processing unit 36 may perform similar control on the encoding unit 32 in the case of receiving feedback indicating that underflow has occurred in the reception buffer 44 from the reception apparatus 23 side.

The reception processing unit 41 receives pictures transferred via the network 25 and temporarily stores the pictures in the reception buffer 44 sequentially. Then, the reception processing unit 41 sequentially reads out the picture which has reached display timing according to a frame interval from the reception buffer 44 and supplies the picture to the decoding unit 42. Furthermore, in a case where latency in transfer of a moving image via the network 25 occurs, reception of a picture at display timing is not completed, and underflow occurs in the reception buffer 44, the reception processing unit 41 provides feedback notifying the transmission apparatus 22 side of that effect.

The decoding unit 42 supplies, to the display processing unit 43, a moving image obtained by decoding pictures sequentially supplied from the reception processing unit 41 according to the frame interval.

The display processing unit 43 performs a display process on the moving image supplied from the decoding unit 42 and causes the display apparatus 24 to display the moving image to be reproduced.

The display apparatus 24 includes, for example, a display device such as a liquid crystal panel or an organic electro luminescence (EL) panel, and displays the moving image on which the display process is performed by the display processing unit 43.

In the network camera system 11 configured as described above, latency until the moving image transmitted from the transmission apparatus 22 is reproduced by the reception apparatus 23 can be reduced according to transfer control performed by the transfer control unit 34.

Here, before describing the transfer control performed by the transfer control unit 34, general transfer of a moving image in which transmission control is not performed by the transfer control unit 34 will be described with reference to FIGS. 2 and 2.

Figure 2:
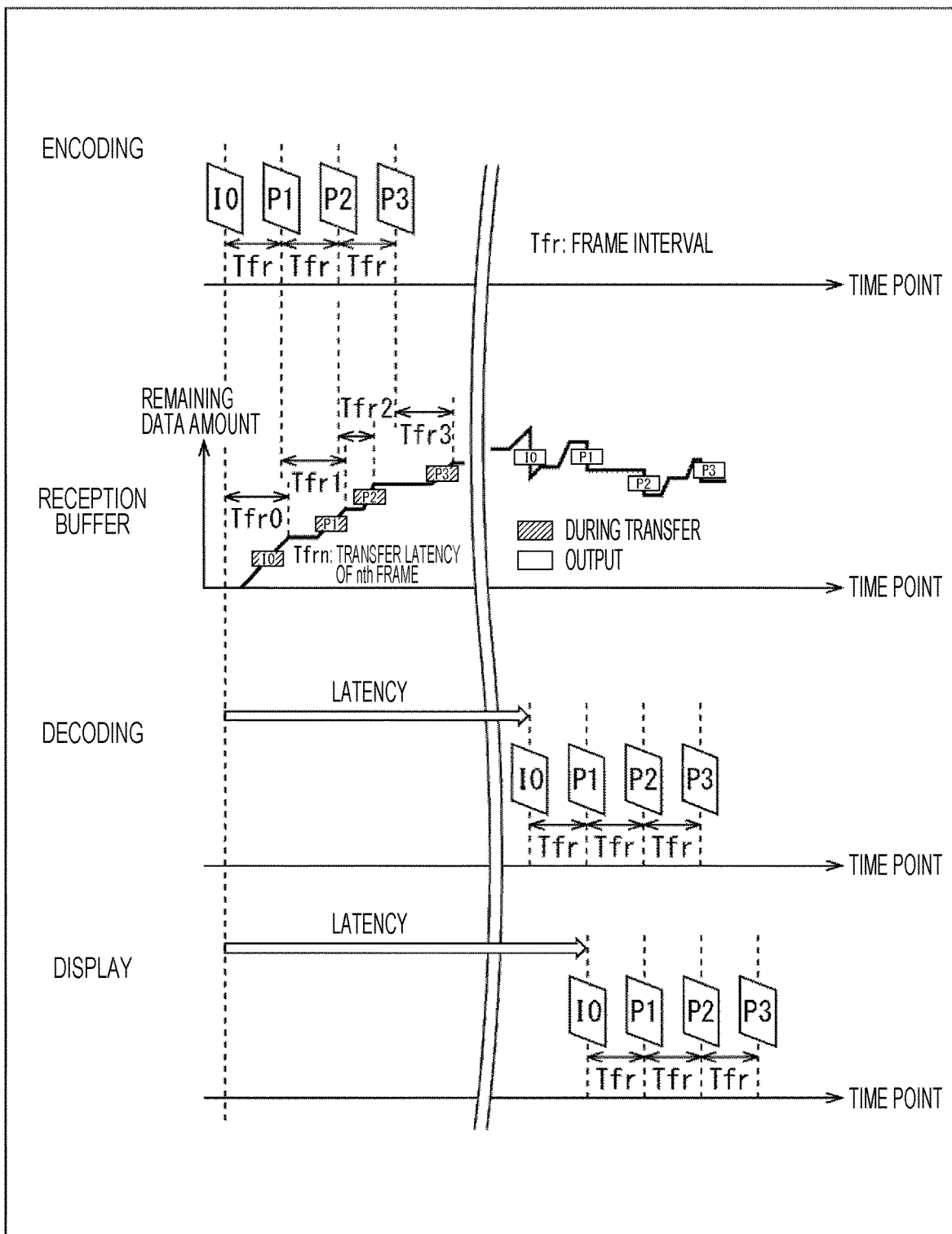
FIG. 2 is a diagram illustrating general transfer of a moving image.

As illustrated in FIG. 2, in the network camera system 11, the encoding unit 32 encodes a moving image to generate a picture (I picture or P picture) for each frame interval Tfr, and sequentially transfers the pictures via the network 25. Then, the reception processing unit 41 sequentially accumulates the pictures received via the network 25 in the reception buffer 44, and transfer latency Tfrn may occur on the network 25 depending on a transfer path through which each picture is transferred.

Therefore, normally, upon transfer of a moving image via the network 25, the reception processing unit 41 needs to include the reception buffer 44 having a sufficient capacity so that the moving image is reproduced without interruption.

Then, fluctuation of the transfer latency Tfrn that occurs on the network 25 can be absorbed by delaying the timing at which the decoding unit 42 performs decoding and the timing at which the display apparatus 24 displays the moving image so that underflow does not occur in the reception buffer 44. As described above, by temporarily accumulating the pictures in the reception buffer 44, latency occurs between the time when the moving image is encoded and the time when the moving image is decoded and displayed.

Here, latency can be reduced by advancing the timing at which the decoding unit 42 performs decoding and the timing at which the display apparatus 24 displays the moving image.

Figure 3:
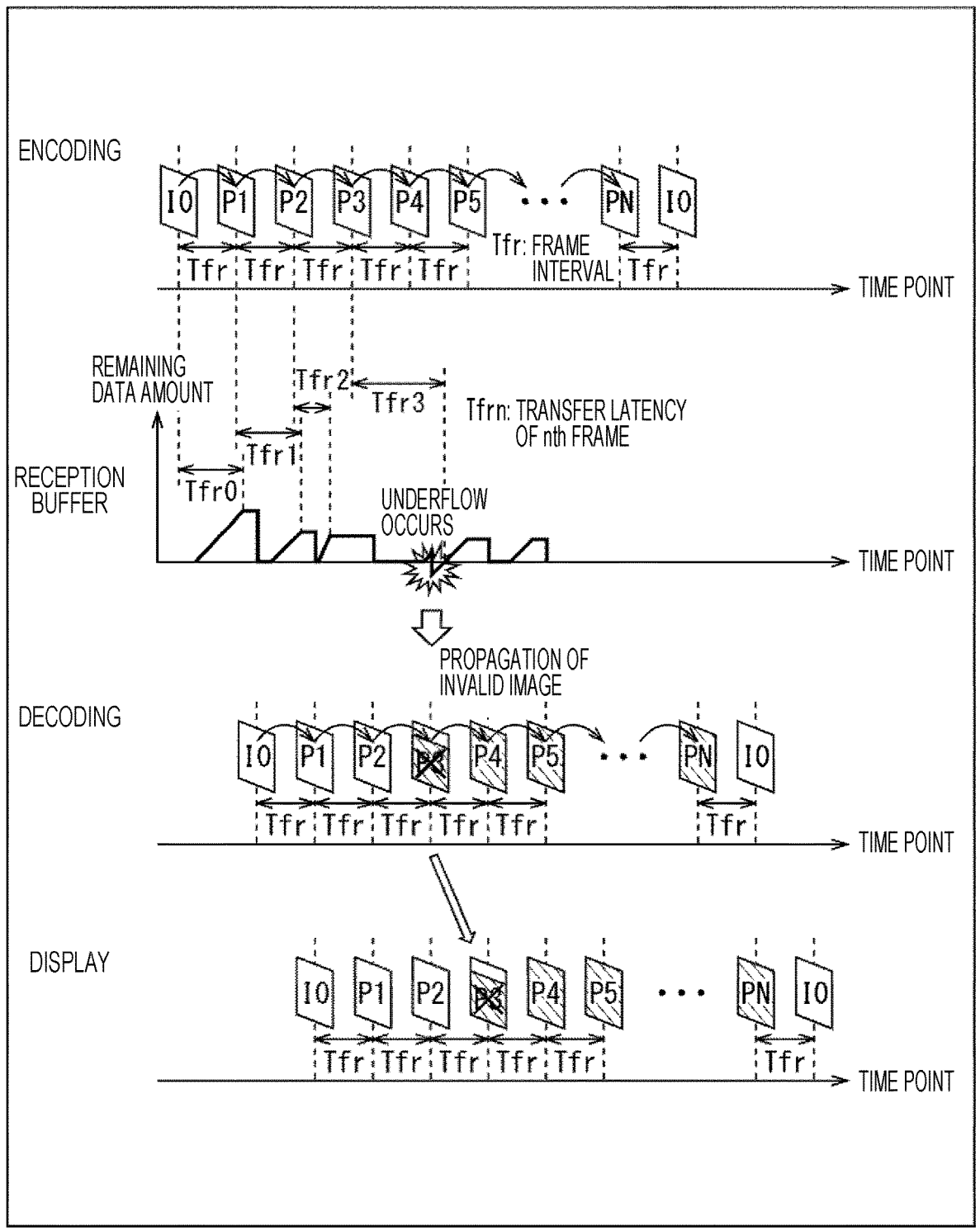
FIG. 3 is a diagram illustrating a state where underflow occurs and invalid image propagates.

However, if it is not possible to cover the maximum transfer latency Tfrn that occurs on the network 25 by reducing the latency, underflow occurs in the reception buffer 44 as illustrated in in FIG. 3.

As a result, the decoding result of the picture in which underflow has occurred is invalid, and as a result of displaying an invalid image, display of the display apparatus 24 is disturbed. Moreover, in a case where a subsequent picture is a P picture obtained by using inter-frame (Inter) prediction, an invalid image is propagated. In this case, an I picture obtained by using the next intra frame (Intra) prediction is returned to normal, Therefore, depending on the interval between I pictures, display disturbance of the display apparatus 24 may continue for a long time.

Therefore, in the network camera system 11, the transfer control unit 34 can perform transfer control that suppresses such disturbance of display on the display apparatus 24 and enables transfer of a moving image with low latency.

For example, the transfer path selection processing unit 35 controls the transmission processing unit 33 so that codes of the respective layers on which spatially scalable encoding is performed by the encoding unit 32 are sent out through the same transfer path or individual transfer paths. At this time, the transfer path selection processing unit 35 selects, as a transfer path for sending out the code of each layer, a path that is predicted to have small transfer latency according to the code amount. Furthermore, the transfer path selection processing unit 35 can improve accuracy of selecting the transfer path by obtaining the statistical value of the latency amount until transfer start and the statistical value of the rate after the transfer start for such selection of the transfer path.

Furthermore, the reference layer control processing unit 36 can judge that a possibility that underflow occurs in the reception buffer 44 is high in a case where it can be determined that latency fluctuation of the transfer path of the code of the upper layer is large on the basis of, for example, the statistical value of the latency amount until transfer start and the statistical value of the rate after the transfer start. Accordingly, in this case, the reference layer control processing unit 36 causes the encoding unit 32 to refer only to an enlarged image from the lower layer. Therefore, even if underflow of the upper layer occurs, it is possible to suppress propagation of an invalid image.

Therefore, the network camera system 11 can suppress transfer latency by appropriately selecting the transfer path, and reduce the risk that the quality of an image to be displayed will deteriorate as a result of advancing decoding time. Therefore, in the network camera system 11, latency until a moving image captured by the imaging apparatus 21 is displayed on the display apparatus 24 can be suppressed.

Here, the configuration of the network 25 and transfer path selection performed by the transfer path selection processing unit 35 will be described with reference to FIG. 4.

Figure 4:
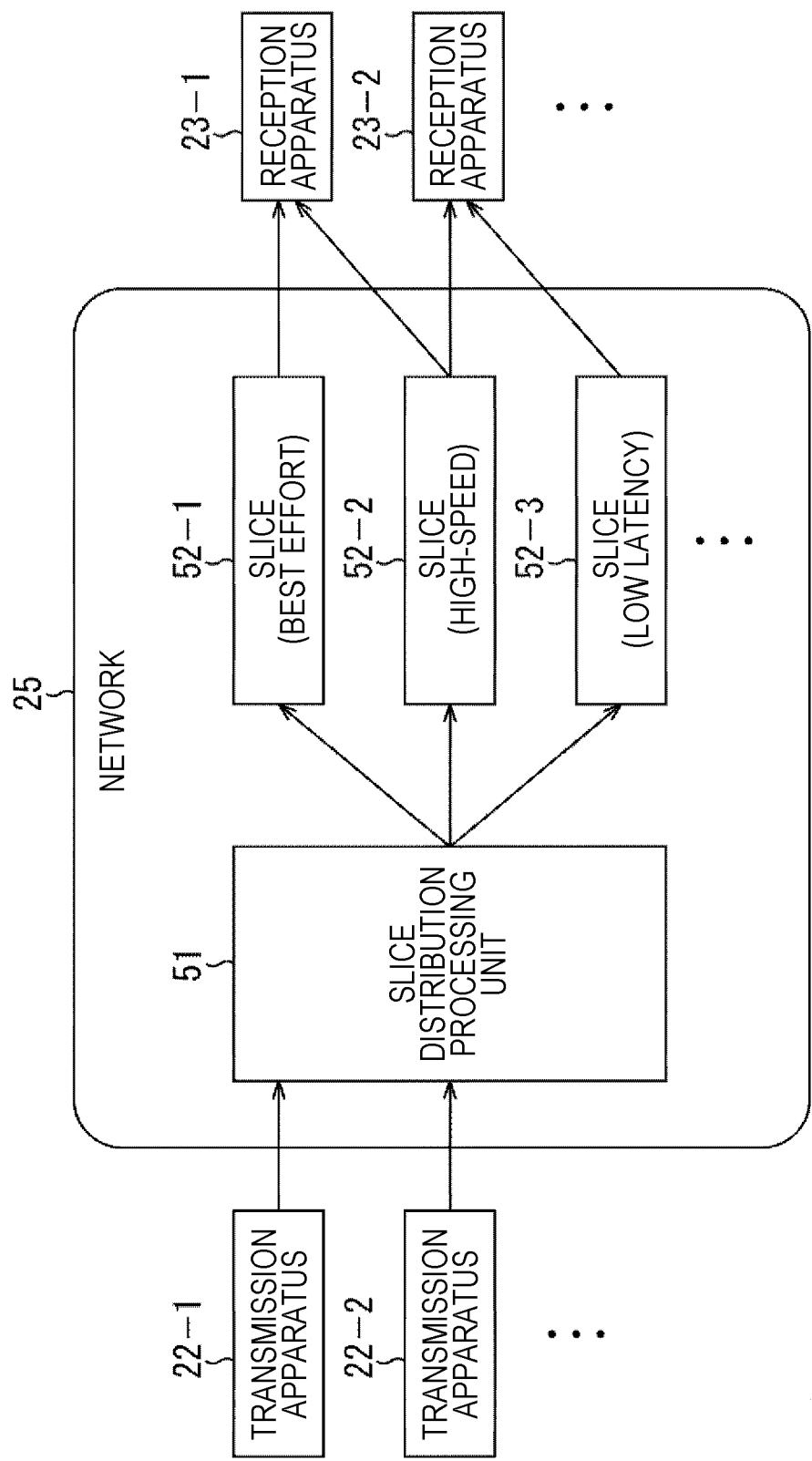
FIG. 4 is a block diagram illustrating a configuration example of a network.

For example, as illustrated in FIG. 4, to the network 25, a plurality of transmission apparatuses 22 (in the example of FIG. 4, two transmission apparatuses 22-1 and 22-2) is connected and a plurality of reception apparatuses 23 (two reception apparatuses 23-1 and 23-2 in the example of FIG. 4) is connected.

The network 25 includes a slice distribution processing unit 51 and a plurality of slices 52 each configuring a logical network. For example, the network 25 can flexibly provide a network function according to a request from a service provider.

The slice distribution processing unit 51 performs a process of distributing communication to the plurality of slices 52 according to the amount of traffic and communication contents in cooperation with virtualization of the network 25.

Each of the plurality of slices 52 is a virtual network obtained by virtually dividing the network 25 into a plurality of pieces, and various functions can be added to each slice 52. In the example illustrated in FIG. 4, a function of executing best effort transfer is added to a slice 52-1, a function of executing high speed transfer is added to a slice 52-2, and a function of performing transfer with low latency added to a slice 52-3. Physical resources necessary for each slice 52 are freely combined to enable the slice 52 to constitute a logical network.

In a case where a plurality of transfer paths can be selected as in the network 25 configured as described above, the transfer path selection processing unit 35 can perform, for example, transfer control of transmitting a moving image with lower latency by selecting a transfer path that is most suitable for the purpose.

Figure 5:
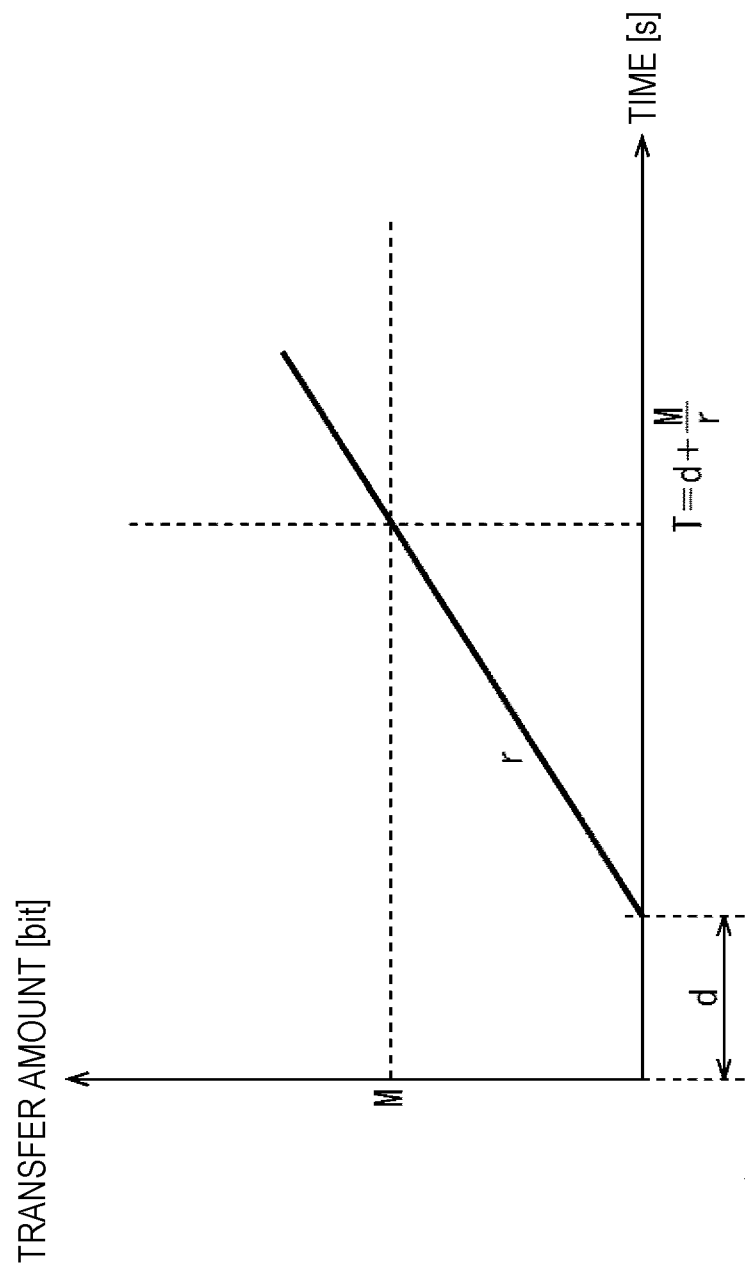
FIG. 5 is a diagram illustrating a latency model of a transfer path.
Figure 6:
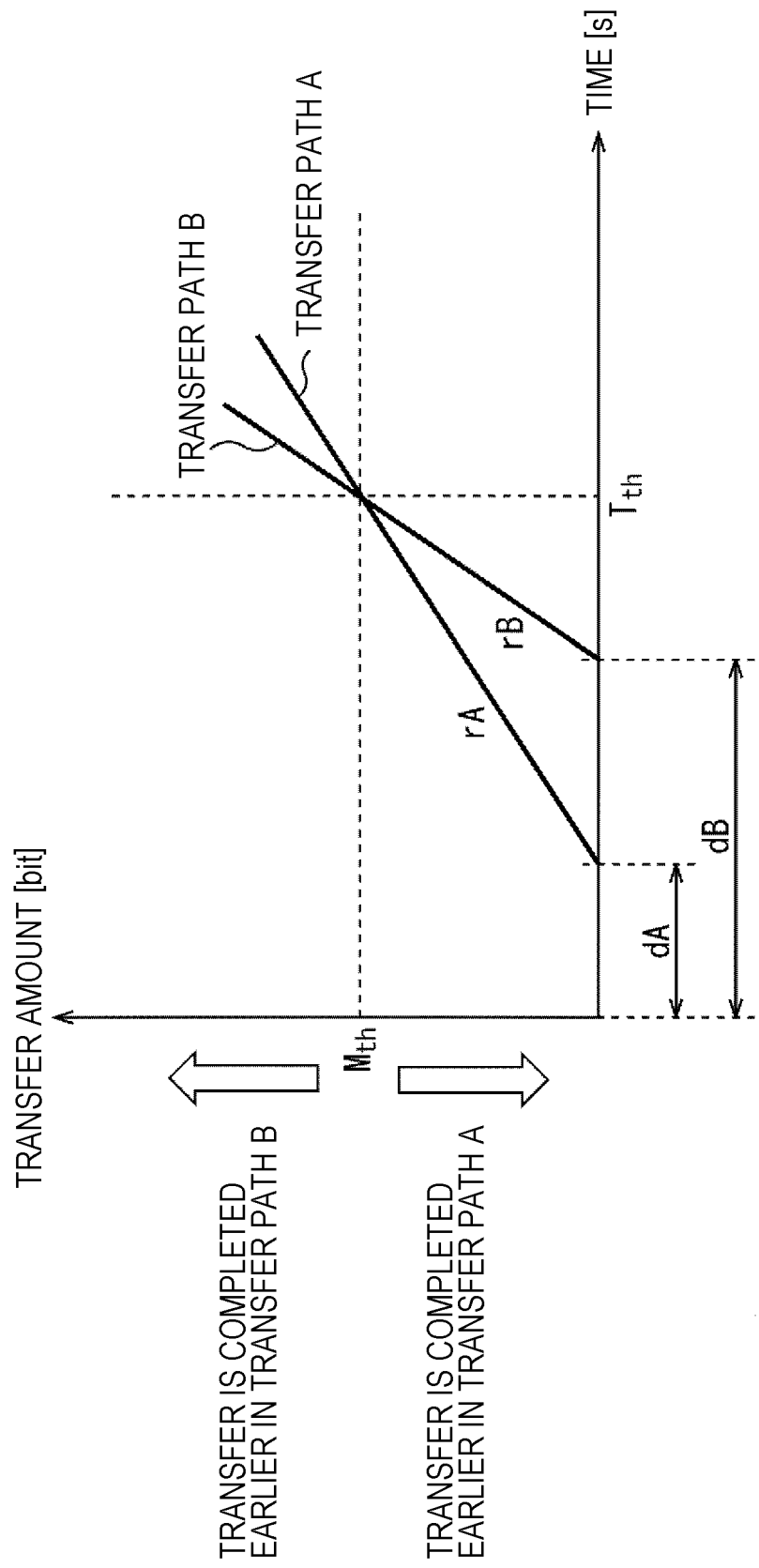
FIG. 6 is a diagram explaining a process of selecting an earlier arrival path from two types of transfer paths.

With reference to FIGS. 5 and 6, transfer path selection performed by the transfer path selection processing unit 35 will be described.

FIG. 5 illustrates a latency model of the transfer path.

For example, as illustrated in FIG. 5, in a case where latency in the transfer path is expressed by a linear expression with transfer start waiting time d and transfer rate r, transfer of the code amount M takes time T as indicated by the following expression (1).

[Mathematical Expression 1]

$$T = d + \frac{M}{r} \qquad (1)$$

Then, as illustrated in FIG. 6, in a case where there are two types of transfer paths with different transfer start waiting times d and transfer rates r, the transfer path (earlier arrival path) transfer through which is predicted to be completed earlier depends on the code amount M. Therefore, the transfer path selection processing unit 35 can grasp the transfer start waiting time d and the transfer rate r in each transfer path, and can obtain, by calculation, a boundary code amount $M_{th}$ at which the earlier arrival path is switched. Then, the transfer path selection processing unit 35 can select the earlier arrival path by comparing the code amount of the encoding result with the boundary code amount $M_{th}$.

For example, the transfer path selection processing unit 35 stores actual values as the transfer start waiting time d and the transfer rate r, calculates statistical values of the average values and standard deviations, and can predict the earlier arrival path on the basis of the statistical values. That is, by using a rate average value rM, a latency average value dM, a rate standard deviation s(r), a latency standard deviation s(d), and a prediction parameter n, the transfer path selection processing unit 35 can obtain a predicted rate rP and predicted latency do by calculating the following expression (2).

[Mathematical Expression 2]

$$\begin{cases} rP = rM - n \times s(r) \\ dP = dM + n \times s(d) \end{cases} \quad (2)$$

Here, the greater the prediction parameter n used in Expression (2), the more pessimistic the prediction is with a lower rate and greater latency.

Note that actual values of the transfer start waiting time d and the transfer rate r used by the transfer path selection processing unit 35 to obtain the statistical values may be accumulated in the transmission apparatus 22, or may be obtained via the network 25 from a server that collects accumulation information of the plurality of transmission apparatuses 22. Furthermore, since the actual values of the transfer start waiting time d and the transfer rate r are considered to depend on the time zone and the location, the prediction accuracy can be improved by generating a map from the actual values for each time point and position information.

The transfer path selection processing unit 35 calculates the predicted rate rP and the predicted latency dP thus obtained for each of a plurality of transfer paths. The transfer path selection processing unit 35 can calculate the boundary code amount $M_{th}$ illustrated in FIG. 6 on the basis of the predicted rate rP and the predicted latency dP, and can select the earlier arrival path.

For example, the boundary code amount $M_{th}$ and the time $T_{th}$ when the boundary code amount $M_{th}$ is reached illustrated in FIG. 6 are calculated as illustrated in the following Expression (3) by using the predicted rate rPA and the predicted latency dPA of the transfer path A, and the predicted rate rPB and the predicted latency dPB of the transfer path B.

[Mathematical Expression 3]

$$\begin{cases} M_{th} = rPA \times rPB \times \dfrac{dPA - dPB}{rPA - rPB} \\ T_{th} = \dfrac{rPA \times dPA - rPB \times dPB}{rPA - rPB} \end{cases} \quad (3)$$

Then, the transfer path selection processing unit 35 uses the boundary code amount $M_{th}$, and selects the transfer path B in a case where the predicted rate rPB of the transfer path B is greater than the predicted rate rPA of the transfer path A (rPB>rPA), and the code amount M is greater than the boundary code amount $M_{th}$ (M>$M_{th}$). In contrast, the transfer path selection processing unit 35 selects the transfer path. A in a case where the predicted rate rPB of the transfer path. B is greater than the predicted rate rPA of the transfer path A (rPB>rPA), and the code amount M is equal to or less than the boundary code amount $M_{th}$ (M≤$M_{th}$). That is, in the illustrated example, it is predicted that transfer through the transfer path A is completed earlier until the time $T_{th}$ when the boundary code amount $M_{th}$ is reached, and it is predicted that transfer through the transfer path B is predicted to be earlier after the time $T_{th}$.

Note that an element of transfer costs can be included in the boundary code amount $M_{th}$. For example, in a case where the bit unit price cA of the transfer path A is greater than the bit unit price cB of the transfer path B (cA>cB), by multiplying the boundary code amount $M_{th}$ by a coefficient (=cB/cA), the transfer path can be selected in consideration of latency and transfer costs.

As described above, in the network camera system 11, a moving image can be transmitted with lower latency by selecting a transfer path transfer through which is predicted to be completed earlier.

A process in which the reference layer control processing unit 36 controls the reference layer will be described with reference to FIG. 7.

In the transmission apparatus 22, the encoding unit 32 can perform spatially scalable encoding for coding of a moving image. That is, the encoding unit 32 performs encoding to generate a stream having a hierarchical structure including a low-resolution base layer BL and a high-resolution enhancement layer EL from a moving image captured by the imaging apparatus 21.

For example, in the base layer BL, the encoding unit 32 performs coding of a P picture by referring only to the decoded image of the base layer BL itself; however, in the enhancement layer EL, the encoding unit 32 can refer to an interlayer IL that is an enlarged image of the decoded image of the base layer BL in addition to the decoded image of the enhancement layer EL itself. Therefore, due to such dependency relationship, encoding of the base layer BL precedes encoding of the enhancement layer EL in time series.

In addition, in the stream generated by the encoding unit 32, the base layer EL and the enhancement layer EL can be transmitted independently. Therefore, the transmission processing unit 33 can send out the base layer BL prior to the enhancement layer EL.

Then, regarding sending out of the base layer EL and the enhancement layer EL, the transfer path selection processing unit 35 makes a comparison with the above-described boundary code amount $M_{th}$ on the basis of the code amount of the stream of each of the base layer EL and the enhancement layer EL to be able to individually select the transfer path. For example, for the base layer BL with a lower code amount, a transfer path with lower latency (for example, a slice 52-3 in FIG. 4) is highly likely to be selected according to the magnitude relationship between resolutions, and the risk that underflow will occur can be reduced than that in the enhancement layer EL with a higher code amount. In contrast, the enhancement layer EL has a higher possibility of passing through a transfer path with greater latency fluctuation.

Therefore, the reference layer control processing unit 36 can predict that a possibility that underflow occurs in the reception buffer 44 is high when the absolute value of latency increases or the fluctuation increases, on the basis of the statistical values calculated by the transfer path selection processing unit 35. On the basis of this, the reference layer control processing unit 36 causes the encoding unit 32 to limit the reference layer to the interlayer IL. In addition, in the case of receiving feedback indicating that underflow has occurred in the reception buffer 44 from the reception apparatus 23 side, the reference layer control processing unit 36 similarly causes the encoding unit 32 to limit the reference layer to the interlayer IL.

In this case, the encoding unit 32 encodes the enhancement layer EL with reference to only the interlayer IL. Therefore, the decoding unit 42 performs decoding without referring to an invalid image, and thus can stop decoding with reference to the invalid image generated due to underflow. As a result, in the reception apparatus 23, when the decoding unit 42 performs decoding and the display processing unit 43 performs the process of displaying on the display apparatus 24, it is possible to suppress propagation of an invalid image and to return the image to the normal image.

As described above, in the network camera system 11, even if underflow occurs in the reception buffer 44 due to occurrence of latency in the transfer path, it is possible to prevent an invalid image from propagating.

Figure 9:
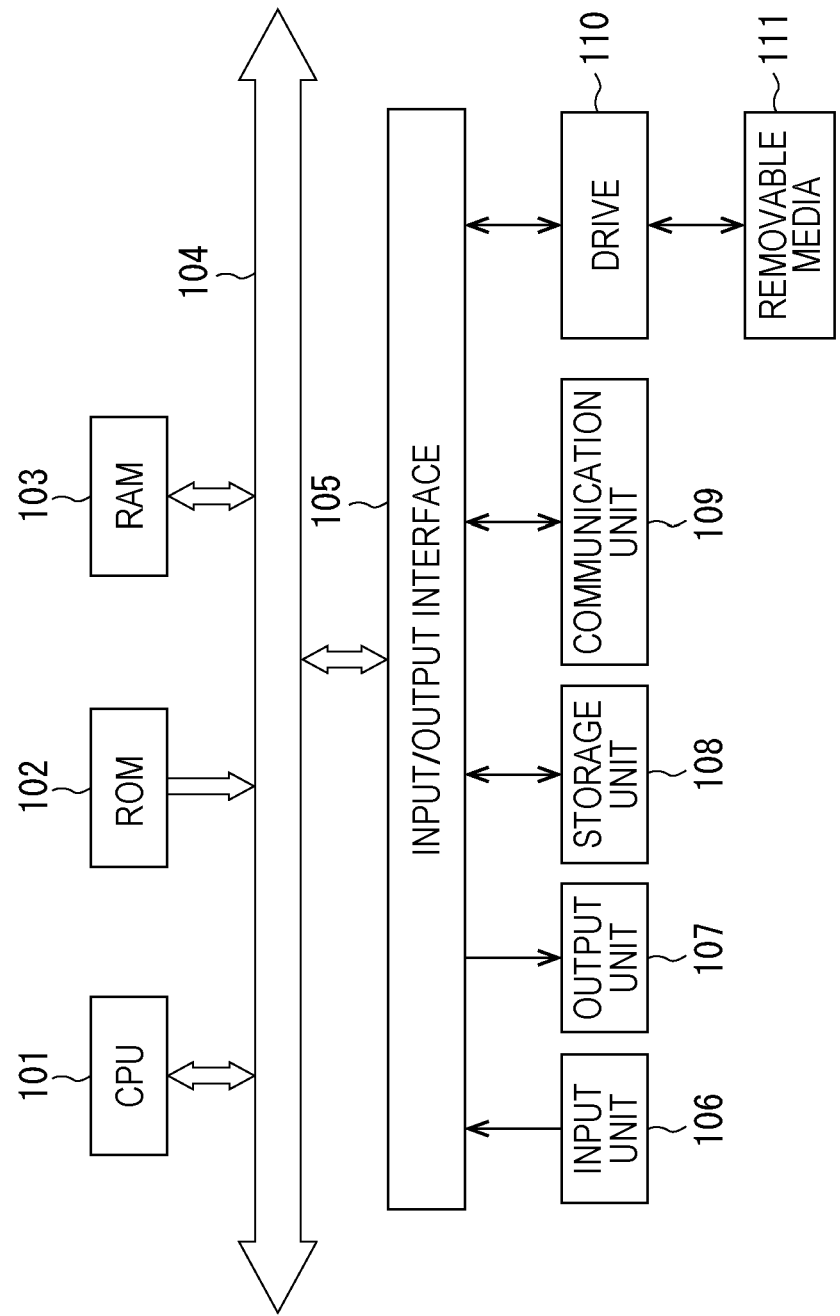
FIG. 9 is a block diagram illustrating a configuration example of an embodiment of a computer to which the present technology is applied.

FIG. 9 is a flowchart illustrating a transmission process in which the transmission apparatus 22 transmits a moving image.

For example, when a moving image captured by the imaging apparatus 21 is supplied to the transmission apparatus 22, the process is started. In step S11, the encoding unit 32 performs spatially scalable encoding on the moving image on which an image process has been performed by the image processing unit 31. Therefore, the encoding unit 32 generates a stream having a hierarchical structure including a low-resolution base layer BL and a high-resolution enhancement layer EL and supplies the stream to the transmission processing unit 33.

In step S12, the encoding unit 32 notifies the transfer path selection processing unit 35 of the transfer control unit 34 of the code amounts of the base layer EL and the enhancement layer EL coded in step S11.

In step S13, the transfer path selection processing unit 35 compares the code amounts of the base layer BL and the enhancement layer EL with the boundary code amount $M_{th}$ (see FIG. 6), and selects the transfer path transfer through which is predicted to be completed earlier on the basis of the comparison results. Then, the transfer path selection processing unit 35 causes the transmission processing unit 33 to perform transmission through the selected transfer path.

In step S14, the transmission processing unit 33 transmits the base layer EL and the enhancement layer EL supplied from the encoding unit 32 in step S11 through the transfer path selected by the transfer path selection processing unit 35 in step S13.

In step S15, the reference layer control processing unit 36 judges whether or not a high possibility that underflow occurs in the reception buffer 44 is predicted, or feedback indicating that underflow has occurred in the reception buffer 44 is received from the reception apparatus 23 side.

In step S15, in a case where a high possibility that underflow occurs in the reception buffer 44 is not predicted, and in a case where it is judged that feedback indicating that underflow has occurred in the reception buffer 44 is not received from the reception apparatus 23 side, the process returns to step S11, and the similar process is repeated thereafter.

In contrast, in step S15, in a case where a high possibility that underflow occurs in the reception buffer 44 is predicted, or in a case where feedback indicating that underflow has occurred in the reception buffer 44 is received from the reception apparatus 23 side, the process proceeds to step S16.

In Step S16, after the reference layer control processing unit 36 causes the encoding unit 32 to limit the reference layer to the interlayer IL, the process returns to step S11. In this case, the encoding unit 32 encodes the enhancement layer EL with reference only to the interlayer IL in only the next step S11.

Thereafter, the similar process is repeated until supply of the moving image captured by the imaging apparatus 21 is stopped.

As described above, in the network camera system 11, in the transmission apparatus 22, the transfer control unit 34 can adaptively select a transfer path on the basis of the statistical amount of transfer latency. Therefore, transfer latency can be kept low, and as a result, the risk of occurrence of underflow in the reception buffer 44 in the reception apparatus 23 can be reduced.

In addition, in the network camera system 11, the encoding unit 32 performs spatially scalable encoding in the transmission apparatus 22. Then, in the network camera system 11, for example, by adaptively selecting the reference layer of the upper layer according to latency fluctuation of the transfer path of codes of the upper layer, even when underflow occurs in the reception buffer 44, propagation of an invalid image can be prevented, and deterioration of the quality of the image displayed on the display apparatus 24 can be suppressed.

As described, in the network camera system 11, the risk of occurrence of underflow in the reception buffer 44 can be reduced and propagation of an invalid image can be prevented, and therefore the timing at which the decoding unit 42 starts decoding can be advanced. Accordingly, the network camera system 11 can transmit a moving image captured by the imaging apparatus 21 via the network 25 so that the moving image is reproduced on the display apparatus 24 with lower latency.

As a result, the network camera system 11 can improve the convenience of applications that require a response or reply to an image at a remote location received via the network 25, such as a video call, a surveillance camera, or the like.

Computer Configuration Example

Note that the processes described with reference to the above-described flowchart do not necessarily need to be processed in time-series order according to the order described in the flowchart, and may include processes performed in parallel or individually (for example, a parallel process or a process based on an object). In addition, the program may be processed by one CPU, or may be processed in a distributed manner by a plurality of CPUs.

In addition, the above-described series of processes (transmission method) can be executed by hardware or can be executed by software. In a case where the series of processes is executed by software, a program that constitutes the software is installed from a program recording medium on which a program is recorded to a computer built into dedicated hardware or, for example, a general-purpose personal computer or the like to which various programs are installed so as to be able to execute various functions.

FIG. 9 is a block diagram illustrating an example of a hardware configuration of the computer that executes the series of processes described above according to the program.

In the computer, a central processing unit (CPU) 101, a read only memory (ROM) 102, and a random access memory (RAM) 103 are mutually connected by a bus 104.

Moreover, an input/output interface 105 is connected to the bus 104. An input unit 106 including a keyboard, a mouse, a microphone, or the like, an output unit 107 including a display, a speaker, or the like, a storage unit 108 including a hard disk, a nonvolatile memory, or the like, and a communication unit 109 including a network interface or the like, and a drive 110 that drives a removable medium 111 such as a magnetic disc, an optical disc, a magneto-optical disc, or a semiconductor memory are connected to the input/output interface 105.

In the computer configured as described above, for example, the CPU 101 loads the program stored in the storage unit 108 into the RAM 103 via the input/output interface 105 and the bus 104 and executes the program, and thus the above-described series of processes is performed.

The program executed by the computer (CPU 101) is recorded on the removable medium 111 that is a package medium including, for example, a magnetic disc (including a flexible disc), an optical disc (compact disc-read only memory (CD-ROM), a digital versatile disc (DVD), or the like), a magneto-optical disc, or a semiconductor memory, or the like, or is provided via a wired or wireless transfer medium such as a local area network, the Internet, or digital satellite broadcasting.

Then, the program can be installed to the storage unit 108 via the input/output interface 105 by inserting the removable medium 111 into the drive 110. Furthermore, the program can be received by the communication unit 109 via a wired or wireless transfer medium and can be installed in the storage unit 108. In addition, the program can be installed in advance into the ROM 102 or the storage unit 108.

Examples of Configuration Combinations

Note that the present technology can also be configured as follows.

(1)
A transmission apparatus including:
an encoding unit that performs spatially scalable encoding on a moving image;
a transmission processing unit that performs a process of transmitting a picture for each layer encoded by the encoding unit, via a network; and
a reference layer control processing unit that causes the encoding unit to limit a reference layer to be referred to upon encoding of an upper layer to an intermediate layer generated from a lower layer in a case where a high possibility that underflow occurs in a reception buffer is predicted, or feedback indicating that underflow has occurred in the reception buffer is received.

(2)
The transmission apparatus according to the above (1), further including
a transfer path selection processing unit that selects a transfer path transfer through which transfer is predicted to be completed earlier according to a code amount of a picture for each layer encoded by the encoding unit, and causes the transmission processing unit to perform transmission through the transfer path selected.

(3)
The transmission apparatus according to the above (2), in which the transfer path selection processing unit selects the transfer path on the basis of comparison between a code amount of the picture and a boundary code amount obtained by using a statistical value of a latency amount until transfer start in the transmission processing unit and a statistical amount of a rate after the transmission processing unit starts transfer.

(4)
The transmission apparatus according to the above (3), in which the reference layer control processing unit predicts whether or not a possibility that underflow occurs in the reception buffer is high on the basis of the statistical value of the latency amount and the statistical amount of the rate.

(5)
The transmission apparatus according to any one of the above to (4),
in which the network includes a plurality of virtual networks which is obtained by virtually dividing entirety of the network and to which respective functions are added.

(6)
A transmission method including:
performing, by a transmission apparatus that transmits a moving image, spatially scalable encoding on the moving image;
performing, by the transmission apparatus, a process of transmitting a picture for each layer encoded, via a network; and
performing, by the transmission apparatus, control to limit a reference layer to be referred to upon encoding of an upper layer to an intermediate layer generated from a lower layer, in a case where a high possibility that underflow occurs in a reception buffer is predicted, or feedback indicating that underflow has occurred in the reception buffer is received.

(7)
A program causing a computer of a transmission apparatus that transmits a moving image to perform a process including:
performing spatially scalable encoding on the moving image;
performing a process of transmitting a picture for each layer encoded, via a network; and
performing control to limit a reference layer to be referred to upon encoding of an upper layer to an intermediate layer generated from a lower layer, in a case where a high possibility that underflow occurs in a reception buffer is predicted, or feedback indicating that under low has occurred in the reception buffer is received.

Note that the present embodiments are not limited to the above-described embodiments, and various modifications can be made without departing from the scope of the present disclosure. In addition, the effects described in the present description are illustrations only and not limited, and may have other effects.

REFERENCE SIGNS LIST

11 Network camera system
21 Imaging apparatus
22 Transmission apparatus
23 Reception apparatus
24 Display apparatus
25 Network
31 Image processing unit
32 Encoding unit
33 Transmission processing unit
34 Transfer control unit
35 Transfer path selection processing unit
36 Reference layer control processing unit
41 Reception processing unit
42 Decoding unit
43 Display processing unit
44 Reception buffer
51 Slice distribution processing unit
52-1 to 52-3 Slice

The invention claimed is:

1. A transmission apparatus comprising:
   circuitry configured to
   generate a map of statistical values based on an actual transfer rate of a moving image for each transfer path of a plurality of transfer paths,
   calculate prediction information including a predicted transfer rate and a predicted latency for each transfer path based on the generated map,
   select a transfer path among the plurality of transfer paths to use for transfer of the moving image based the calculated prediction information, and
   switch a reference layer for encoding of an enhancement layer of the moving image to an interlayer of the moving image according to the predicted transfer rate.

2. The transmission apparatus according to claim 1, wherein the circuitry is further configured to
   compare an actual transfer rate for a currently used transfer path with the generated map,
   extract one or more transfer paths of the plurality of transfer paths that have a predicted transfer rate higher than the actual transfer rate for the currently used transfer path,
   calculate a boundary code amount and a time related to the boundary code amount to determine whether to continue using the currently used transfer path or to continue with a selected transfer path of the extracted transfer paths,
   select the extracted transfer path to use for the transfer based on transfer path of the plurality of transfer paths through which the transfer is predicted to be completed earlier, and
   transfer the moving image through the selected transfer path.

3. The transmission apparatus according to claim 2, wherein the circuitry calculates the boundary code amount and the related time based on the predicted rate and the predicted latency for each extracted transfer path of the one or more extracted transfer paths.

4. A transmission method comprising:
   generating a map of statistical values based on an actual transfer rate of a moving image for each transfer path of a plurality of transfer paths;
   calculating prediction information including a predicted transfer rate and a predicted latency for each transfer path based on the generated map;
   selecting a transfer path among the plurality of transfer paths to use for transfer of the moving image based the calculated prediction information; and
   switching a reference layer for encoding of an enhancement layer of the moving image to an interlayer of the moving image according to the predicted transfer rate.

5. A non-transitory computer-readable storage medium having embodied thereon a program, which when executed by a computer of a transmission apparatus that transmits a moving image causes the computer to perform a method, the method comprising:
   generating a map of statistical values based on an actual transfer rate of a moving image for each transfer path of a plurality of transfer paths;
   calculating prediction information including a predicted transfer rate and a predicted latency for each transfer path based on the generated map;
   selecting a transfer path among the plurality of transfer paths to use for transfer of the moving image based the calculated prediction information; and
   switching a reference layer for encoding of an enhancement layer of the moving image to an interlayer of the moving image according to the predicted transfer rate.

6. The transmission apparatus according to claim 1, wherein the actual transfer rate for each transfer path is obtained via a network from a server.

* * * * *